United States Patent
Kawada et al.

(10) Patent No.: US 12,415,449 B2
(45) Date of Patent: Sep. 16, 2025

(54) CONVEYANCE SEAT

(71) Applicant: TS TECH CO., LTD., Asaka (JP)

(72) Inventors: Haruhiko Kawada, Tochigi (JP); Naohiro Sasaki, Tochigi (JP); Yuma Tanabe, Tochigi (JP); So Ono, Tochigi (JP); Takamasa Sonoda, Tochigi (JP); Hayato Shimazaki, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 452 days.

(21) Appl. No.: 17/912,666

(22) PCT Filed: Mar. 22, 2021

(86) PCT No.: PCT/JP2021/011749
§ 371 (c)(1),
(2) Date: Sep. 19, 2022

(87) PCT Pub. No.: WO2021/193552
PCT Pub. Date: Sep. 30, 2021

(65) Prior Publication Data
US 2023/0144393 A1    May 11, 2023

(30) Foreign Application Priority Data
Mar. 23, 2020    (JP) .................................. 2020-051307

(51) Int. Cl.
*B60N 2/56*    (2006.01)
*B60N 2/00*    (2006.01)
(Continued)

(52) U.S. Cl.
CPC ......... *B60N 2/5685* (2013.01); *B60N 2/0022* (2023.08); *B60N 2/0033* (2023.08);
(Continued)

(58) Field of Classification Search
CPC .. B60N 2/5685; B60N 2/0022; B60N 2/0033; B60N 2/58; B60N 2210/46; B60N 2/68; A47C 7/62; A47C 7/74; A47C 2/5685
(Continued)

(56) References Cited

U.S. PATENT DOCUMENTS

| 7,937,789 B2 * | 5/2011 | Feher ....................... A47C 7/74 5/714 |
| 9,333,884 B2 * | 5/2016 | Tachikawa ............. B60N 2/206 |

(Continued)

FOREIGN PATENT DOCUMENTS

| CN | 201780174 U | 3/2011 |
| JP | 2002-270338 | 9/2002 |
| WO | WO 02/06083 | 1/2002 |

OTHER PUBLICATIONS

Chinese Office Action (w/ English translation) for corresponding Application No. 202180021406.6, dated Mar. 6, 2024, 9 pages.
(Continued)

*Primary Examiner* — Jacques M Saint Surin
(74) *Attorney, Agent, or Firm* — Dority & Manning, P.A.

(57) ABSTRACT

There is provided a conveyance seat that suppresses the deterioration of the sensitivity of a load sensor to an input load even when a heater wire and the load sensor are disposed to overlap each other. A conveyance seat includes a seat cushion that supports buttocks of an occupant; a seat back connected to the seat cushion to serve as a backrest for the occupant; a load sensor provided at the seat cushion or at a portion of the seat back; a heater wire disposed on an occupant side with respect to the load sensor; and an intermediate member that positions the heater wire. The intermediate member is disposed between the load sensor and the heater wire.

9 Claims, 12 Drawing Sheets

(51) Int. Cl.
*B60N 2/58* (2006.01)
*B60N 2/68* (2006.01)
(52) U.S. Cl.
CPC ............... *B60N 2/58* (2013.01); *B60N 2/68* (2013.01); *B60N 2210/46* (2023.08)
(58) Field of Classification Search
USPC ....................................................... 177/136
See application file for complete search history.

(56) References Cited

U.S. PATENT DOCUMENTS

| | | | |
|---|---|---|---|
| 9,550,440 B2 * | 1/2017 | Nagayasu | ................ B60N 2/39 |
| 10,556,532 B2 * | 2/2020 | Gallagher | ............ B60N 2/5685 |
| 11,225,176 B2 * | 1/2022 | Hayashi | ............... B60N 2/4249 |
| 11,697,362 B2 * | 7/2023 | Tanaka | ................ B60N 2/3075 |
| | | | 297/188.1 |
| 2002/0000742 A1 | 1/2002 | Wato et al. | |
| 2021/0323443 A1 * | 10/2021 | Ozawa | ................ B60N 2/5621 |

OTHER PUBLICATIONS

PCT International Search Report and Written Opinion (w/ English translation) for corresponding PCT Application No. PCT/JP2021/011749, mailed on Jun. 15, 2021, 10 pages.

* cited by examiner

CONVEYANCE SEAT

CROSS REFERENCE TO RELATED APPLICATIONS

This application is the U.S. National Stage entry of International Application No. PCT/JP2021/011749 filed under the Patent Cooperation Treaty on Mar. 22, 2021, which claims priority to Japanese Patent Application No. 2020-051307 filed on Mar. 23, 2020, both of which are incorporated herein by reference.

TECHNICAL FIELD

The present invention relates to a conveyance seat, particularly to a conveyance seat in which a seat back or a seat cushion is provided with a load sensor.

BACKGROUND ART

There is a conveyance seat in which both a load sensor that detects that an occupant is seated and a heating element (heater) that heats the seat for heating are disposed.

The load sensor provided in the conveyance seat is used to determine whether or not the occupant is seated in the conveyance seat, whether the occupant is an adult or a child, and in what posture the occupant is seated. The detection of the occupant by the load sensor is used in, for example, a seat belt reminder (SBR) system that urges the occupant to wear a seat belt when the seat belt is not worn.

The load sensor is formed of a membrane switch including multiple contacts and, for example, is disposed between a trim cover (skin material) and a cushion pad forming a seat cushion of the conveyance seat.

The heating element disposed inside the seat is a seat heater formed in a sheet shape and, for example, is disposed on the load sensor disposed on the cushion pad. The seat heater is configured such that a heater wire made of an electric resistor is disposed on a base material made of a material having a low thermal conductivity, for example, a non-woven fabric such as polyester resin. In a conveyance seat of the related art, the heater wire is directly disposed vertically above a contact portion (pressure sensitive portion) of the load sensor or in the vicinity of the contact portion, and even when a predetermined load is applied onto the contact portion of the load sensor, the seat heater does not bend and the sensitivity to detect a seating state of the occupant decreases, which is a problem.

For this reason, for example, in a seat disclosed in Patent Literature 1, in consideration of an influence of the heater wire on the load sensor (referred to as a seating sensor in Patent Literature 1), the heater wire is disposed at a position where the heater wire does not overlap the load sensor.

CITATION LIST

Patent Literature

PATENT LITERATURE 1: JP 2002-270338 A

SUMMARY OF INVENTION

Technical Problem

However, when the heater wire is disposed not to overlap the load sensor, the deterioration of the sensitivity of the load sensor to an input load is unlikely to occur, but a disposition place of the heater wire is limited, so that the heating performance may be affected.

Therefore, the present invention is conceived in view of the foregoing problems, and an object of the present invention is to provide a conveyance seat that suppresses the deterioration of the sensitivity of a load sensor to an input load even when a heater wire and the load sensor are disposed to overlap each other.

Solution to Problem

In order to solve the foregoing problems, a conveyance seat according to the present invention includes: a seat cushion that supports buttocks of an occupant; a seat back connected to the seat cushion to serve as a backrest for the occupant; a load sensor provided at the seat cushion or at a portion of the seat back; a heater wire disposed on an occupant side with respect to the load sensor; and an intermediate member that positions the heater wire. The intermediate member is disposed between the load sensor and the heater wire.

In the related art, an intermediate member that positions a heater wire used in a seat heater is disposed to be located on an occupant side with respect to the heater wire. For this reason, when the occupant is seated, the intermediate member is supported by the heater wire and is difficult to bend, and for this reason, even when a predetermined load is applied to a load sensor, a seating state may not be detected and the sensitivity may decrease.

In the present invention, the intermediate member that positions the heater wire is disposed between the load sensor and the heater wire. For this reason, when the occupant is seated, the heater wire presses the intermediate member and the intermediate member bends, so that a switch of the load sensor is turned on. Since the heater wire is located on the occupant side with respect to the intermediate member, the intermediate member bends easily, so that the deterioration of the sensitivity of the load sensor to an input load is suppressed. For this reason, the heater wire can be disposed without considering an influence on the load sensor.

In addition, in this configuration, the load sensor may include a contact portion that is turned on and off by an applied load, and the heater wire may be disposed at a position where the heater wire overlaps the contact portion of the load sensor when viewed from the occupant side.

With this configuration, even when the heater wire overlaps the contact portion, the deterioration of the sensitivity of the load sensor to an input load is suppressed.

In this configuration, a plurality of the heater wires may be disposed at positions where the heater wires overlap the contact portion.

With this configuration, even when the plurality of heater wires overlap the contact portion of the load sensor, the deterioration of the sensitivity of the load sensor to an input load is suppressed.

In this configuration, the heater wire may overlap the contact portion of the load sensor at a position offset from a center of the contact portion.

With this configuration, even when the heater wire overlaps the contact portion of the load sensor at the position offset from the center of the contact portion, the deterioration of the sensitivity of the load sensor to an input load is suppressed.

In this configuration, the heater wire may be disposed at a position where the heater wire overlaps a center of the contact portion of the load sensor.

With this configuration, even when the heater wire is disposed at the position where the heater wire overlaps the center of the load sensor, the deterioration of the sensitivity of the load sensor to an input load is suppressed.

In this configuration, the intermediate member may be a foundation fabric, and the heater wire may be fixed onto the foundation fabric.

Since the intermediate member is the foundation fabric, the intermediate member bends easily, so that the deterioration of the sensitivity of the load sensor to an input load is suppressed.

In this configuration, the foundation fabric may be fixed to a surface of a pad forming the seat cushion or the seat back.

Since the foundation fabric is fixed to the surface of the pad, the foundation fabric bends easily, so that the deterioration of the sensitivity of the load sensor to an input load is suppressed.

In this configuration, the foundation fabric may be fixed to a back surface of a skin material forming the seat cushion or the seat back.

Since the foundation fabric is fixed to the back surface of the skin material, the foundation fabric bends easily, so that the deterioration of the sensitivity of the load sensor to an input load is suppressed.

In this configuration, the intermediate member may be a member having flexibility.

Since the intermediate member has flexibility, the intermediate member bends easily, so that the deterioration of the sensitivity of the load sensor to an input load is suppressed.

In addition, in this configuration, the seat cushion and the seat back each may include a frame forming a skeleton, a pad that is a cushion material covering the frame, and a skin material covering the pad.

Advantageous Effects of Invention

In the present invention, the intermediate member that positions the heater wire is disposed between the load sensor and the heater wire. For this reason, when the occupant is seated, the heater wire presses the intermediate member and the intermediate member bends, so that a switch of the load sensor is turned on. Since the heater wire is located on the occupant side with respect to the intermediate member, the intermediate member bends easily, so that the deterioration of the sensitivity of the load sensor to an input load is suppressed. For this reason, the heater wire can be disposed without considering an influence on the load sensor.

In addition, with this configuration, even when the heater wire overlaps the contact portion, the deterioration of the sensitivity of the load sensor to an input load is suppressed.

In addition, with this configuration, even when the plurality of heater wires overlap the contact portion of the load sensor, the deterioration of the sensitivity of the load sensor to an input load is suppressed.

In addition, with this configuration, even when the heater wire overlaps the contact portion of the load sensor at the position offset from the center of the contact portion, the deterioration of the sensitivity of the load sensor to an input load is suppressed.

In addition, with this configuration, even when the heater wire is disposed at the position where the heater wire overlaps the center of the load sensor, the deterioration of the sensitivity of the load sensor to an input load is suppressed.

In addition, since the intermediate member is the foundation fabric, the intermediate member bends easily, so that the deterioration of the sensitivity of the load sensor to an input load is suppressed.

In addition, since the foundation fabric is fixed to the surface of the pad, the foundation fabric bends easily, so that the deterioration of the sensitivity of the load sensor to an input load is suppressed.

In addition, since the foundation fabric is fixed to the back surface of the skin material, the foundation fabric bends easily, so that the deterioration of the sensitivity of the load sensor to an input load is suppressed.

In addition, since the intermediate member has flexibility, the intermediate member bends easily, so that the deterioration of the sensitivity of the load sensor to an input load is suppressed.

BRIEF DESCRIPTION OF DRAWINGS

FIG. 5B is a cross-sectional view showing a state where a load is applied to the contact portion of the load sensor and the contact portion is turned on.

DESCRIPTION OF EMBODIMENTS

Hereinafter, a configuration of a conveyance seat according to one embodiment of the present invention (present embodiment) will be described with reference to the drawings. Meanwhile, the embodiment to be described below is one example for facilitating understanding of the present invention and does not limit the present invention. Namely, the present invention can be changed or improved without departing from the concept thereof, and it goes without saying that the present invention includes equivalents thereof.

Incidentally, hereinafter, a vehicle seat will be provided as one example of the conveyance seat, and a configuration example of the vehicle seat will be described. Meanwhile, the present invention can also be applied to a conveyance seat other than the vehicle seat, for example, to a seat mounted in a ship or an aircraft.

In addition, in the following description, a "front to back direction" is a front to back direction of the vehicle seat and is a direction coinciding with a traveling direction of a vehicle in traveling. In addition, a "seat width direction" is a width direction of the vehicle seat and is a direction coinciding with a right to left direction when viewed from an occupant seated in the vehicle seat. In addition, an "up to down direction" is an up to down direction of the vehicle seat and is a direction coinciding with a vertical direction when the vehicle travels on a horizontal surface.

In addition, in the following description, when various directions such as the "seat width direction" and a "seat height direction" are described with "seat" added thereto, the various directions indicate directions with respect to the vehicle seat, and when directions are described with "vehicle" such as "vehicle inside" and "vehicle outside" added thereto, the directions indicate directions with respect to the vehicle.

In addition, an "occupant side" indicates a side where the occupant stays when the occupant is seated in a state where the occupant can be seated on the vehicle seat, and means a front side of a seat back in the seat back of the vehicle seat and means an upper side of a seat cushion in the seat cushion.

In addition, unless otherwise specified, the shape, the position, the posture, and the like of each portion of the vehicle seat to be described below will be described based on a case where the occupant can be seated in the vehicle seat.

<<Basic Configuration of Vehicle Seat According to Present Embodiment>>

Figure 1:
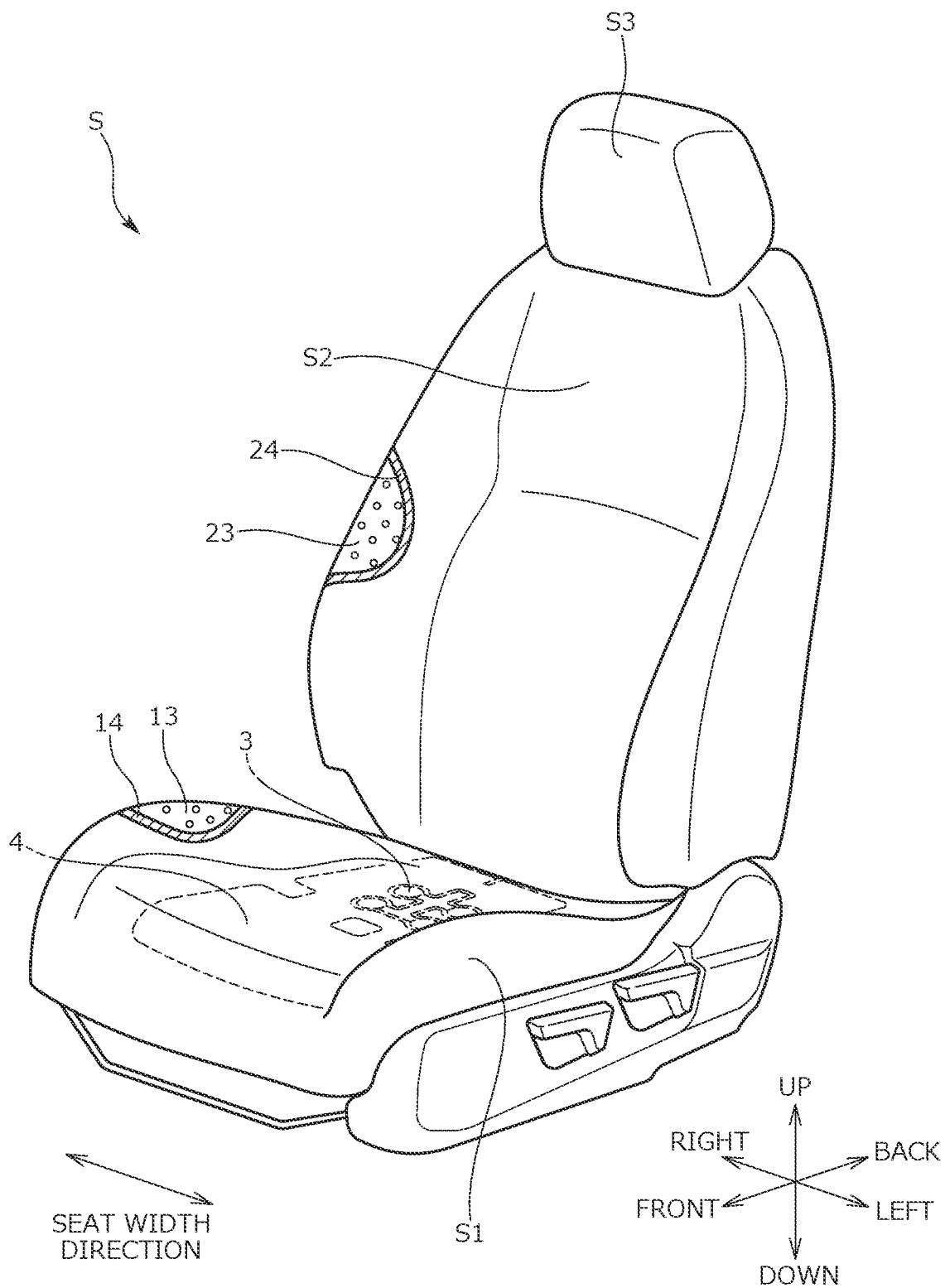
FIG. 1 is a perspective view of a vehicle seat according to one embodiment of the present invention when viewed obliquely from front.
Figure 2:
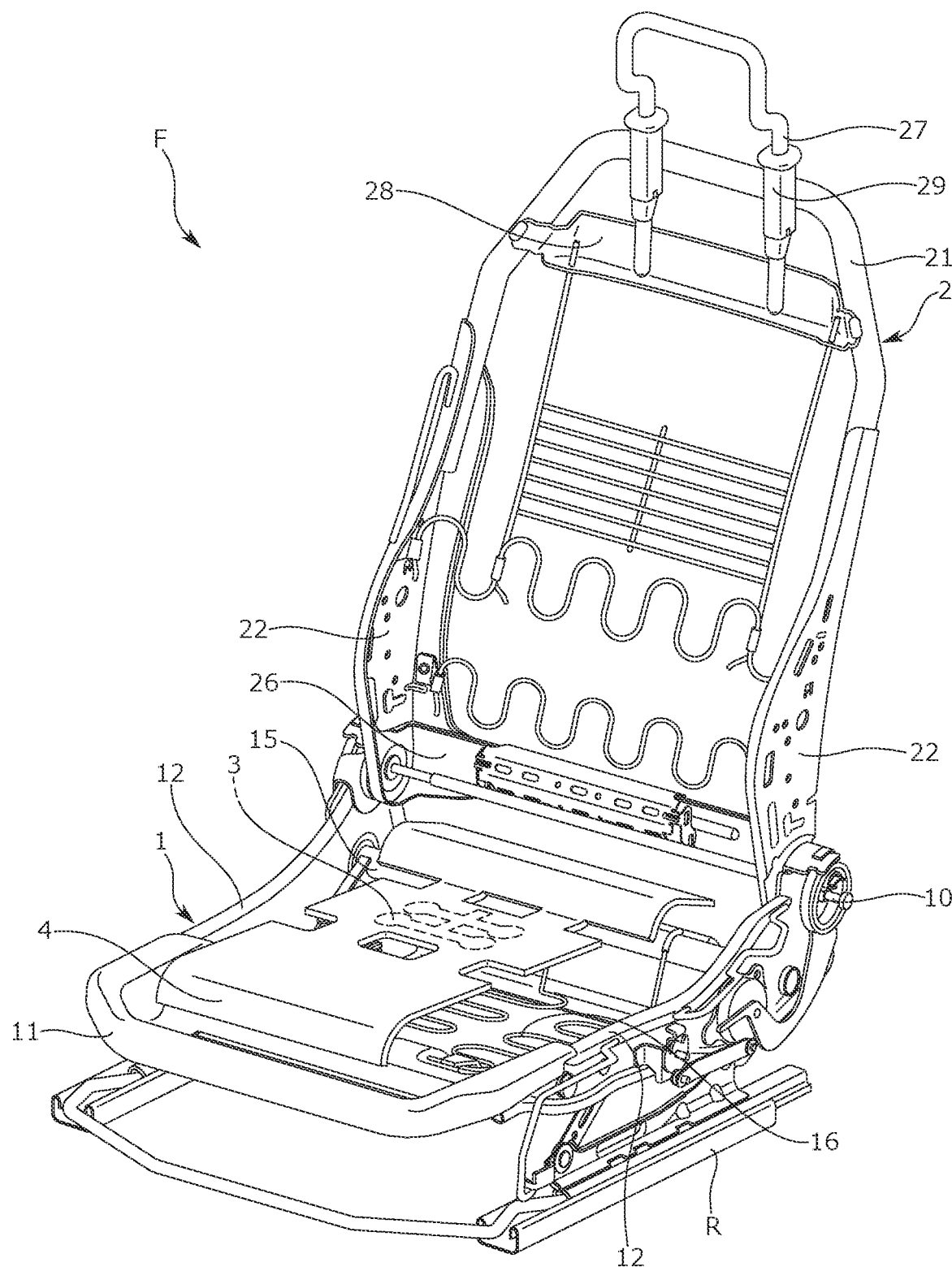
FIG. 2 is a perspective view showing a frame of the vehicle seat according to one embodiment of the present invention.
Figure 3:
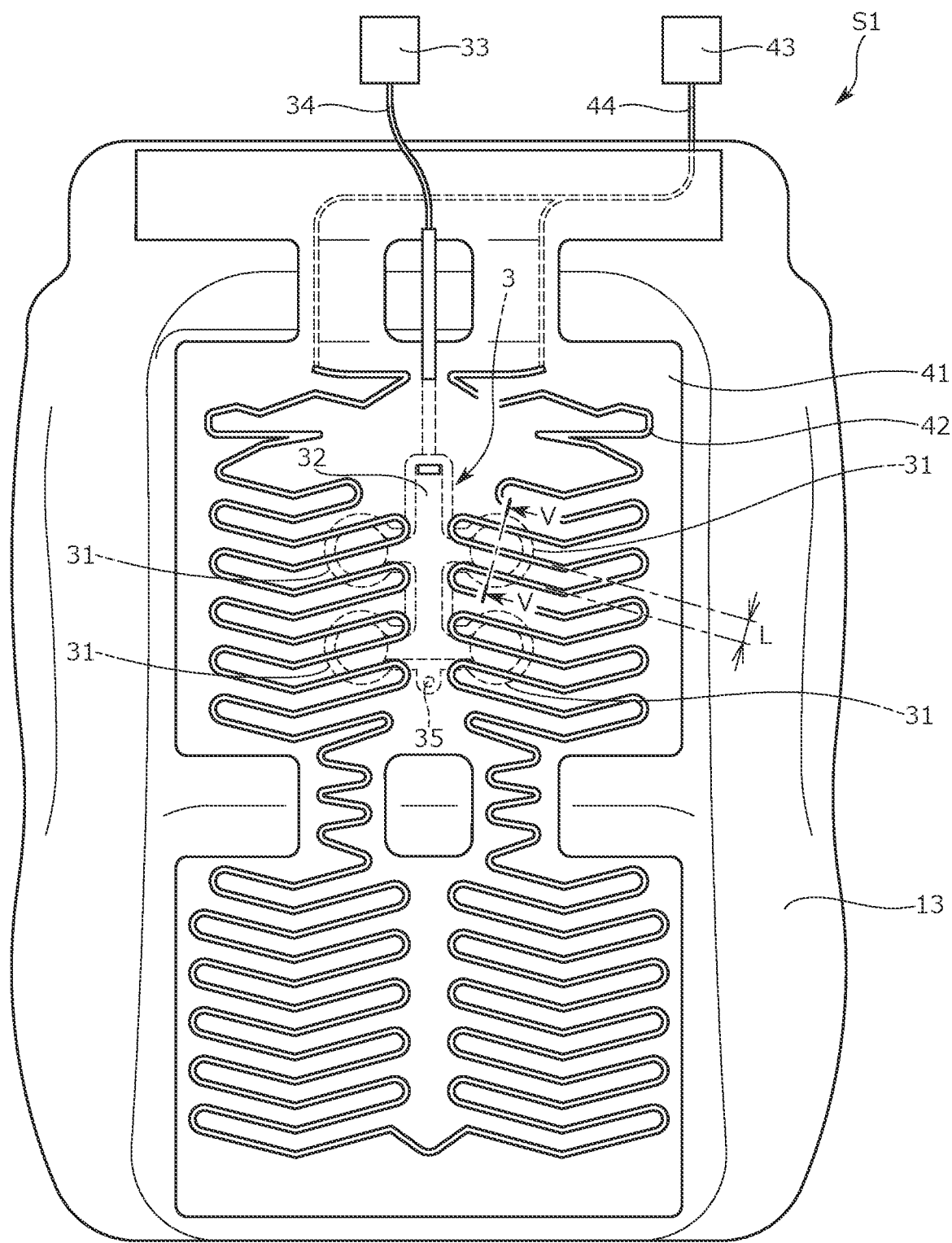
FIG. 3 is a view showing a seat cushion to which a load sensor and a seat heater are attached.

A configuration of a vehicle seat according to the present embodiment (hereinafter, a vehicle seat S) will be described with reference to FIGS. 1 to 3. FIG. 1 is a perspective view of the vehicle seat S when viewed obliquely from front, FIG. 2 is a perspective view showing a seat frame F of the vehicle seat S, and FIG. 3 is a plan view showing a seat cushion S1 of the vehicle seat S to which a load sensor 3 and a seat heater 4 are attached. In FIG. 1, for convenience of illustration, a portion of the vehicle seat S is illustrated in a state where trim covers 14 and 24 that are skin members are removed. In addition, FIG. 3 shows the seat cushion S1 with the trim cover 14 removed.

The vehicle seat S is a seat which is placed on a vehicle body floor and in which the occupant of the vehicle is seated. In the present embodiment, the vehicle seat S is used as a front seat corresponding to a front seat of the vehicle. However, the vehicle seat S is not limited to the front seat, and the vehicle seat S may be a rear seat of the vehicle and can also be used as a middle seat of a second row or a rear seat of a third row of a vehicle in which three rows of seats are provided in the front to back direction.

As shown in FIG. 1, the vehicle seat S includes, as main components, the seat cushion S1 serving as a seating portion that supports the buttocks of the occupant, a seat back S2 serving as a backrest that supports the back of the occupant, and a headrest S3 that supports the head of the occupant. The seat cushion S1 and the seat back S2 are connected to each other with a reclining mechanism 10 (refer to FIG. 2) interposed therebetween. In addition, a slide rail R is installed below the seat cushion S1, and the seat cushion S1 is placed on the vehicle body floor in a state where the vehicle seat S is slidable in the front to back direction by the slide rail R (refer to FIG. 2).

The seat frame F shown in FIG. 2 is provided inside the vehicle seat S, and the seat frame F mainly includes a cushion frame 1 and a back frame 2. The cushion frame 1 forms a skeleton of the seat cushion S1 in the seat frame F, and the back frame 2 forms a skeleton of the seat back S2 in the seat frame F. A rear end portion of the cushion frame 1 is connected to a lower end portion of the back frame 2 through the reclining mechanism 10.

The seat cushion S1 is formed by placing a cushion pad 13 that is a cushion material on the cushion frame 1 and by covering the cushion pad 13 with the trim cover 14. The seat back S2 is formed by placing a back pad 23 that is a cushion material on the back frame 2 and by covering the back pad 23 with the trim cover 24.

The cushion pad 13 and the back pad 23 are, for example, a urethane base material molded by foam molding using a urethane foaming agent. In addition, the trim covers 14 and 24 are made of fabric, film, cloth, leather, sheet, or the like and are attached to cover the cushion pad 13 and the back pad 23, respectively, in a state where the trim covers 14 and 24 are stretched to be subjected to a predetermined tension.

In the present embodiment, as shown in FIG. 2, the cushion frame 1 has a substantially square frame shape as an outer shape. Then, the cushion frame 1 includes, as main components, a pair of cushion side frames 12 forming respective right and left end portions in the seat width direction, a pan frame 11 forming a front end portion of the cushion frame 1, a connection pipe 15 connecting the right and left cushion side frames 12 at a rear end portion, and a spring 16.

The back frame 2 is mainly made of a pipe processed into a square frame shape, and as shown in FIG. 2, the back frame 2 includes an upper frame 21 having an inverted U shape, a pair of back side frames 22 forming right and left end portions in the seat width direction, and a lower frame 26 connecting lower end portions of the pair of back side frames 22. In addition, a connection frame 28 that connects portions of the upper frame 21 is provided, the portions extending up and down. Two headrest guides 29 are provided at a center of an upper end of the upper frame 21, and a headrest pillar 27 extending from the headrest S3 can be inserted into and held by the two headrest guides 29.

An exemplary example of a forming material of each member forming the cushion frame 1 and the back frame 2 is a material having a sufficient rigidity such that each member is not greatly deformed when receiving a load, for example, a metal material such as steel or an aluminum alloy. Means for joining the members forming the cushion frame 1 and the back frame 2 is welding, but as the joining means, joining with bolts and an adhesive agent may be used in combination.

The seat heater 4 that is a heating element is provided between the cushion pad 13 and the trim cover 14 of the seat cushion S1. In addition, the load sensor 3 is disposed on a lower side (side opposite the occupant side) of the seat heater 4. Hereinafter, the load sensor 3 and the seat heater 4 provided in the vehicle seat S of the present embodiment will be described with reference to FIGS. 3 to 5B.

<<Load Sensor>>

Figure 5A:
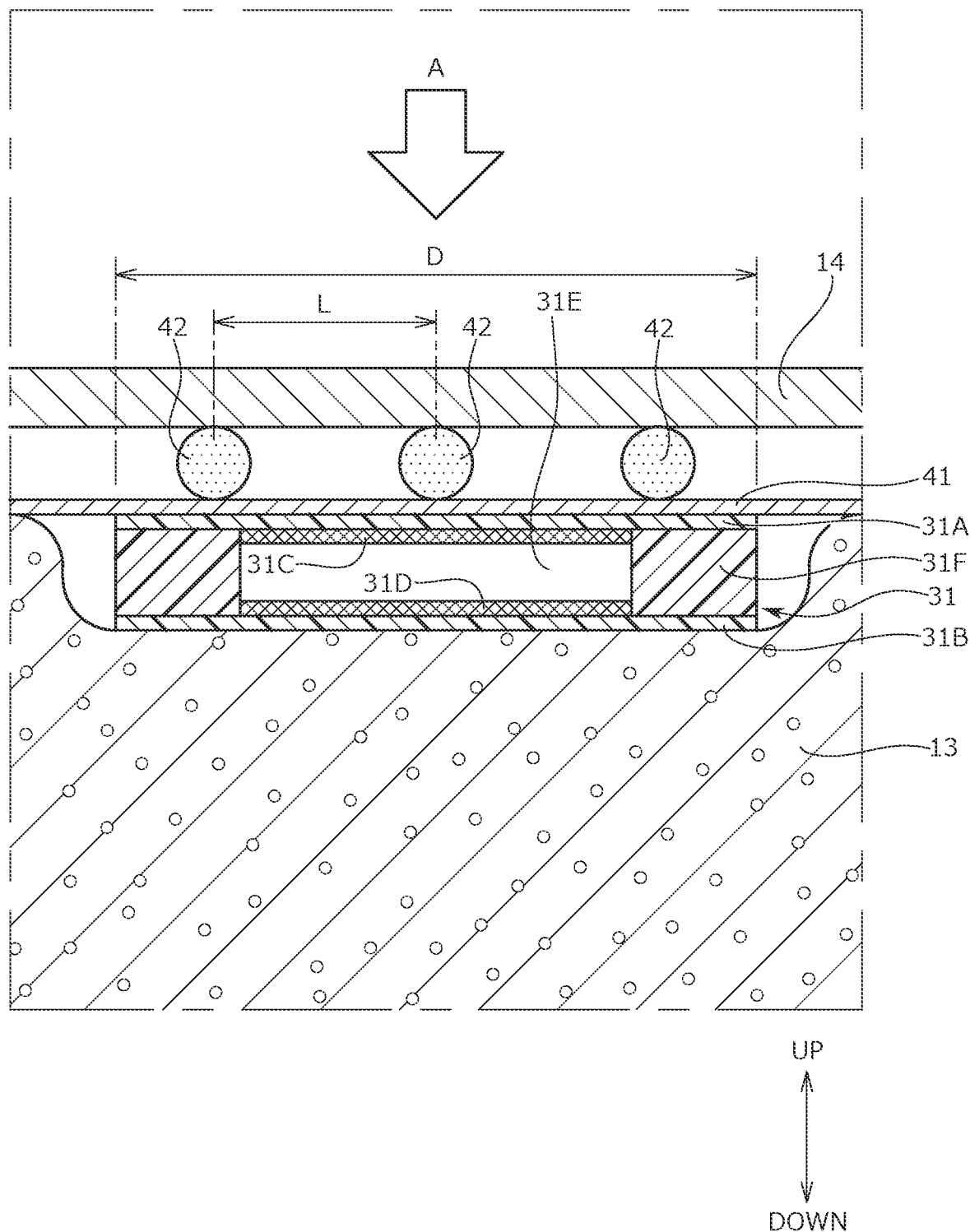
FIG. 5A is a cross-sectional view taken along line V-V of FIG. 3 and is a view showing a positional relationship between the contact portion of the load sensor and the seat heater.

The load sensor 3 is a sensor that detects that the occupant is seated on the seat cushion S1 of the vehicle seat S. The load sensor 3 is a membrane switch and, as shown in FIG. 3, includes a plurality of contact portions 31, a communication portion 32 communicating with the contact portions 31, a circuit unit 33, a harness 34, and an inlet and outlet port 35. As shown in FIG. 5A, each of the contact portions 31 is configured such that a pair of electrodes 31C and 31D are disposed at a predetermined interval inside surface materials 31A and 31B made of a pair of films, to face each other. Namely, an air layer 31E is formed between the pair of electrodes 31C and 31D. An adhesive material 31F including a resin spacer is disposed at a portion at which the electrodes 31C and 31D do not exist. In a state where a load is not applied to the contact portion 31, the interval between the electrodes 31C and 31D is kept by the spacer of the adhesive material 31F. Then, the electrodes 31C and 31D disposed up and down are configured to come into contact with each other when a load is applied to the contact portion 31 from above (refer to FIG. 5B). In other words, the contact portion 31 can be turned on and off by the applied load, and a switch of the contact portion 31 is turned on and off depending on the magnitude of the applied load.

Each of the contact portions 31 is connected to the inlet and outlet port 35 through the communication portion 32 that is an air passage, and air between the electrodes 31C and 31D located on upper and lower sides of the contact portion 31 comes in and out through the communication portion 32 and the inlet and outlet port 35.

The circuit unit 33 is connected to the contact portions 31 to detect an ON signal indicating that the electrodes 31C and 31D on the upper and lower sides of each of the contact portions 31 have come into contact with each other, and to output the detected ON signal to an electronic control unit (ECU) attached to the vehicle through the harness 34 and through the circuit unit 33 to which an end portion of the harness 34 is connected. In a case where the ECU has received an ON signal, for example, when another sensor detects that a seat belt is not fastened, the occupant is urged to fasten the seat belt.

<<Seat Heater>>

Figure 5B:
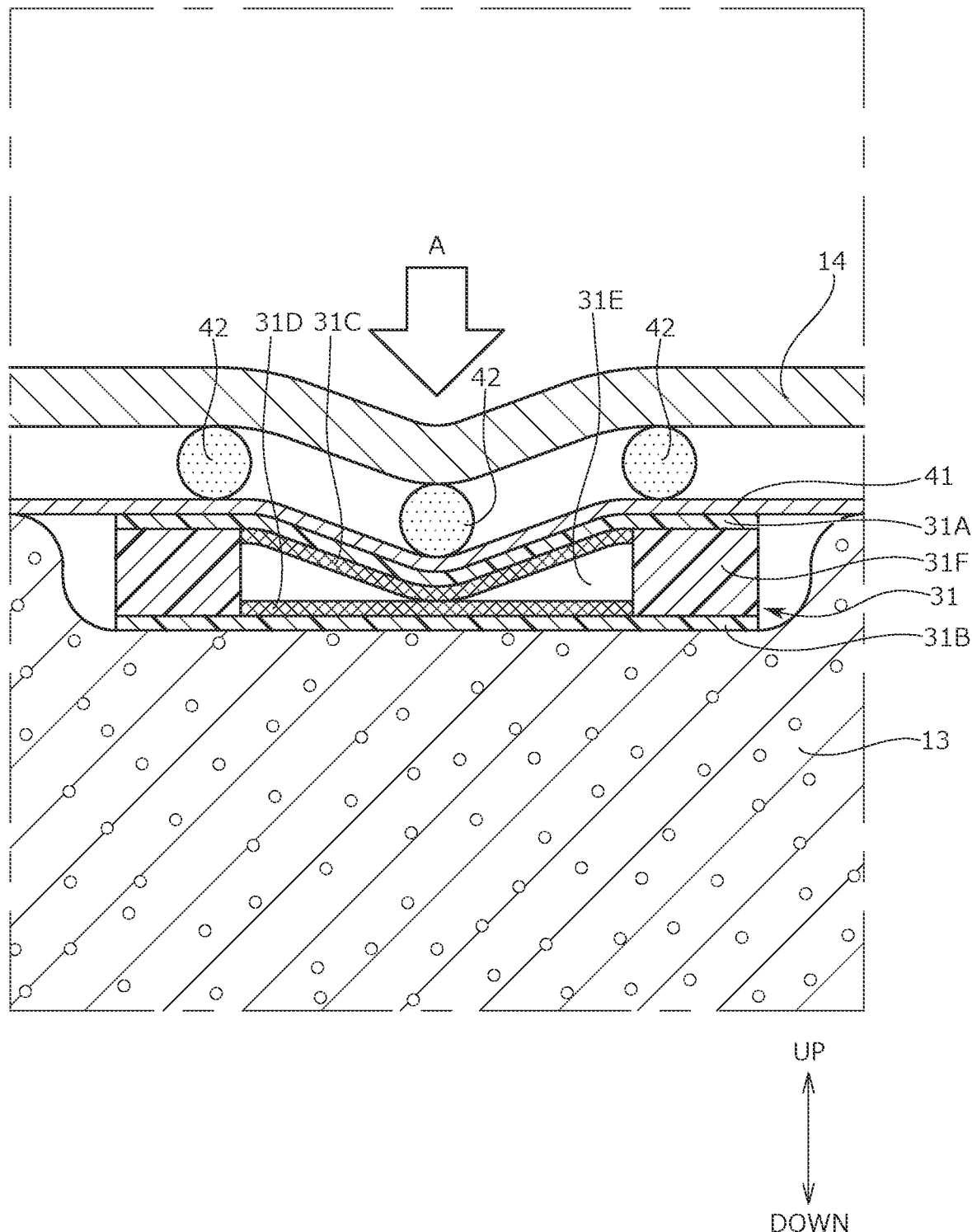

As shown in FIGS. 3, 5A, and 5B, the seat heater 4 is disposed above the contact portion 31 of the load sensor 3. The seat heater 4 includes a foundation fabric 41 (one example of an intermediate member) having a sheet shape, a heater wire 42, a circuit unit 43, and a harness 44. The foundation fabric 41 is made of a material having a low thermal conductivity, for example, a non-woven fabric such as polyester resin. In addition, the foundation fabric 41 has flexibility and is configured to bend when being pressed from above (refer to FIG. 5B). In the present embodiment, the foundation fabric 41 is used as an intermediate member that positions the heater wire 42, but the intermediate member is not limited to the foundation fabric 41 and may be, for example, a rubber sheet having elasticity.

The heater wire 42 is disposed in a meandering shape to cover the entire region of the foundation fabric 41 as shown in FIG. 3, and the position of the heater wire 42 is determined by being fixed onto the foundation fabric 41 with an adhesive agent or the like. The seat heater 4 is formed of a radiant heater formed of the foundation fabric 41 and the heater wire 42. The heater wire 42 is formed of, for example, an electric resistor made of copper, a copper alloy, or the like. The circuit unit 43 causes an electric current to flow to the heater wire 42 through the harness 44, so that heat is generated in the heater wire 42.

In the vehicle seat S of the present embodiment, as shown in FIG. 5A, the load sensor 3 is disposed on the cushion pad 13 of the seat cushion S1. Then, the foundation fabric 41 of the seat heater 4 is disposed on the load sensor 3, and the heater wire 42 is disposed on the foundation fabric 41. The trim cover 14 as a skin material is attached onto the seat heater 4. In other words, the heater wire 42 of the seat heater 4 is disposed on a side where the occupant is located with respect to the load sensor 3 (occupant side), and the foundation fabric 41 is disposed between the heater wire 42 and the load sensor 3.

The foundation fabric 41 is fixed to the cushion pad 13 by an adhesive agent or sewing. The foundation fabric 41 may be fixed to the trim cover 14 that is a skin material.

Figure 4A:
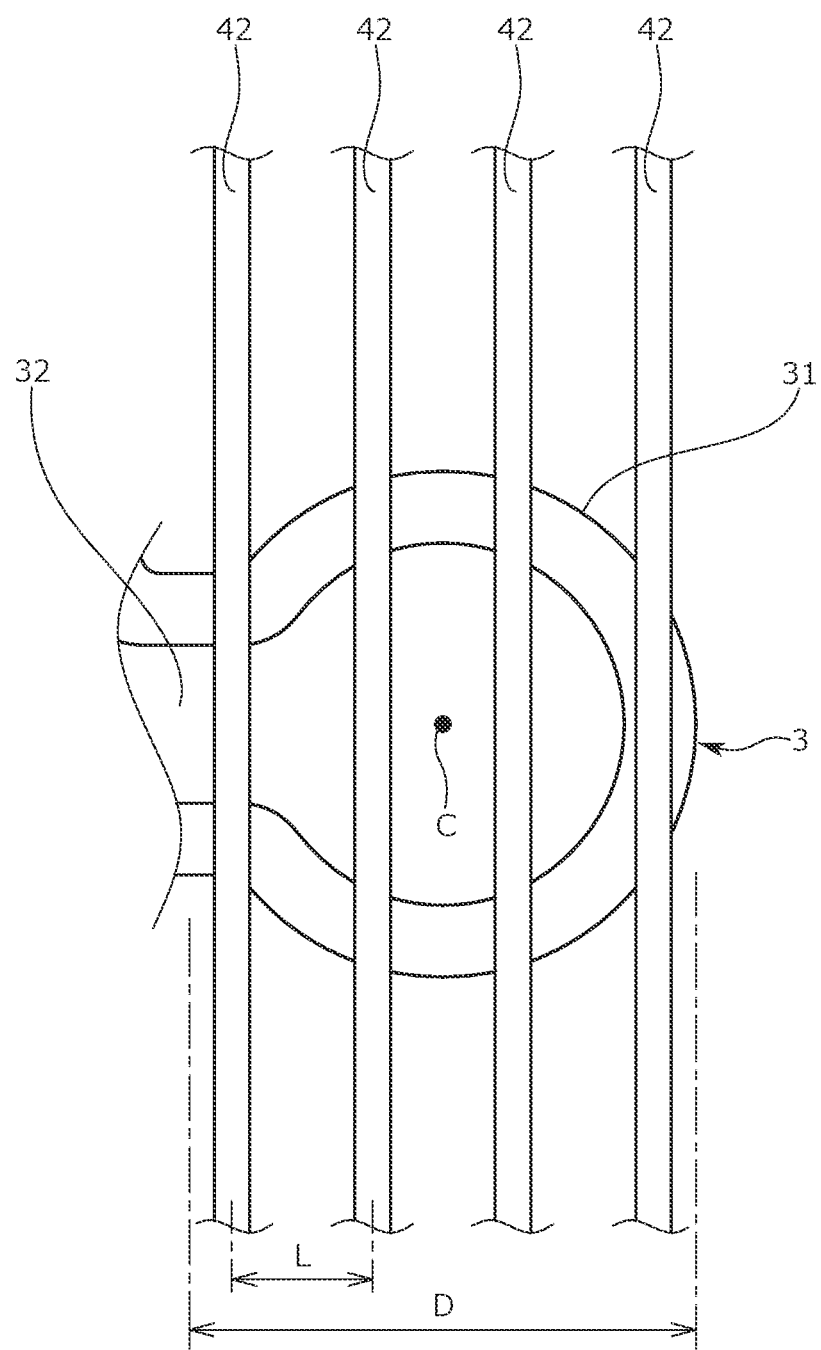
FIG. 4A is a view showing a positional relationship between a contact portion of the load sensor and the seat heater and is a view showing a state where four heater wires overlap the contact portion.
Figure 4B:
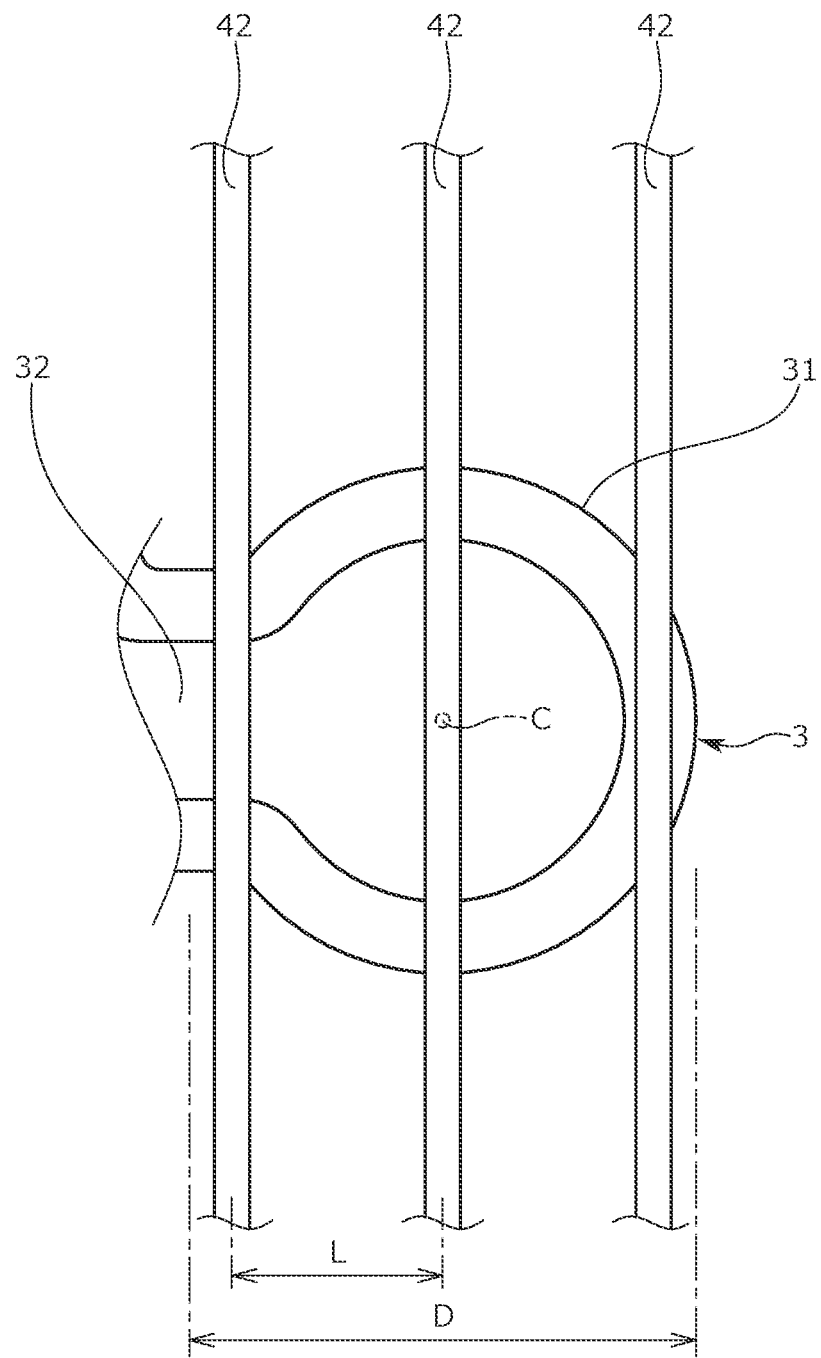
FIG. 4B is a view showing a positional relationship between the contact portion and the seat heater and is a view showing a state where three heater wires overlap the contact portion.
Figure 4C:
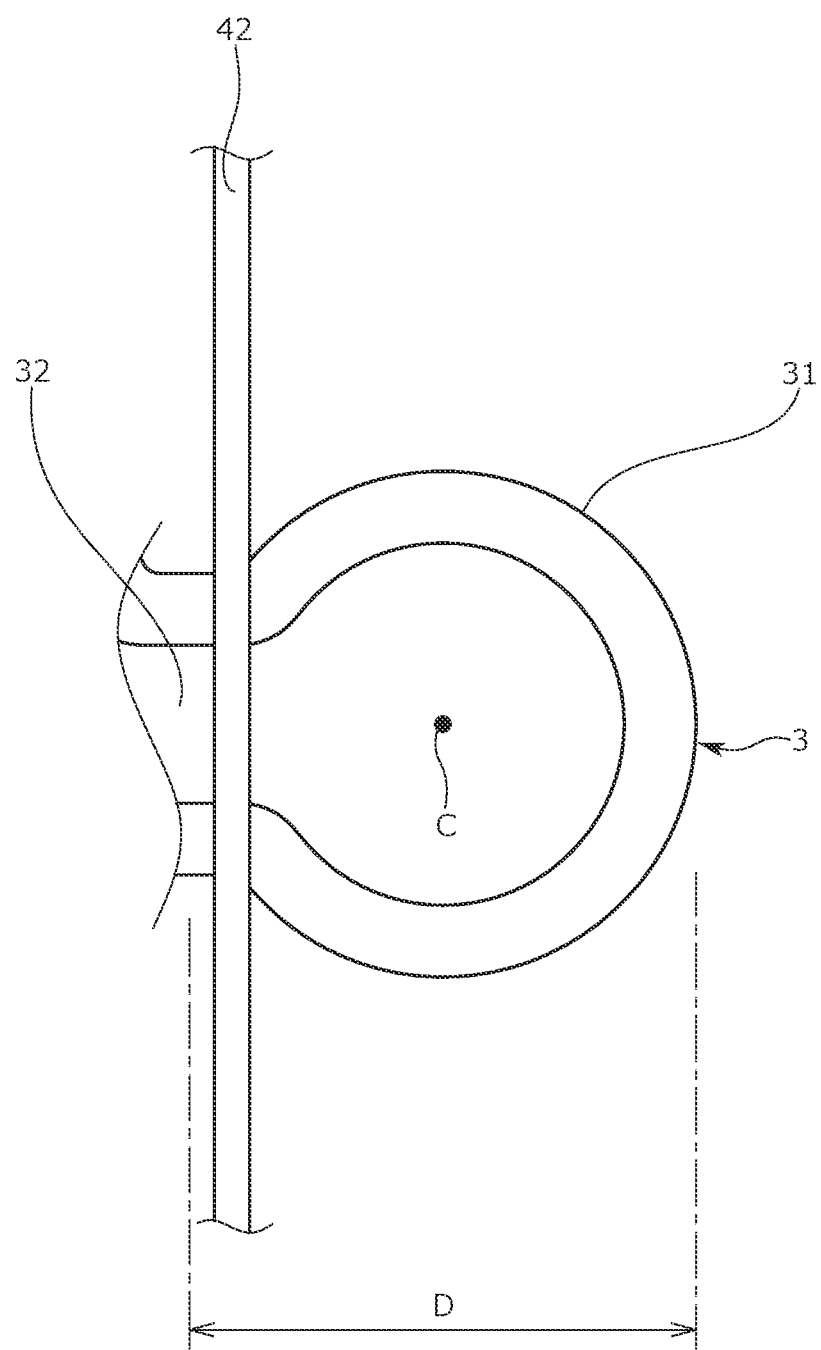
FIG. 4C is a view showing a positional relationship between the contact portion and the seat heater and is a view showing a state where a heater wire is disposed to overlap the contact portion at a position offset from a center of the contact portion.
Figure 4D:
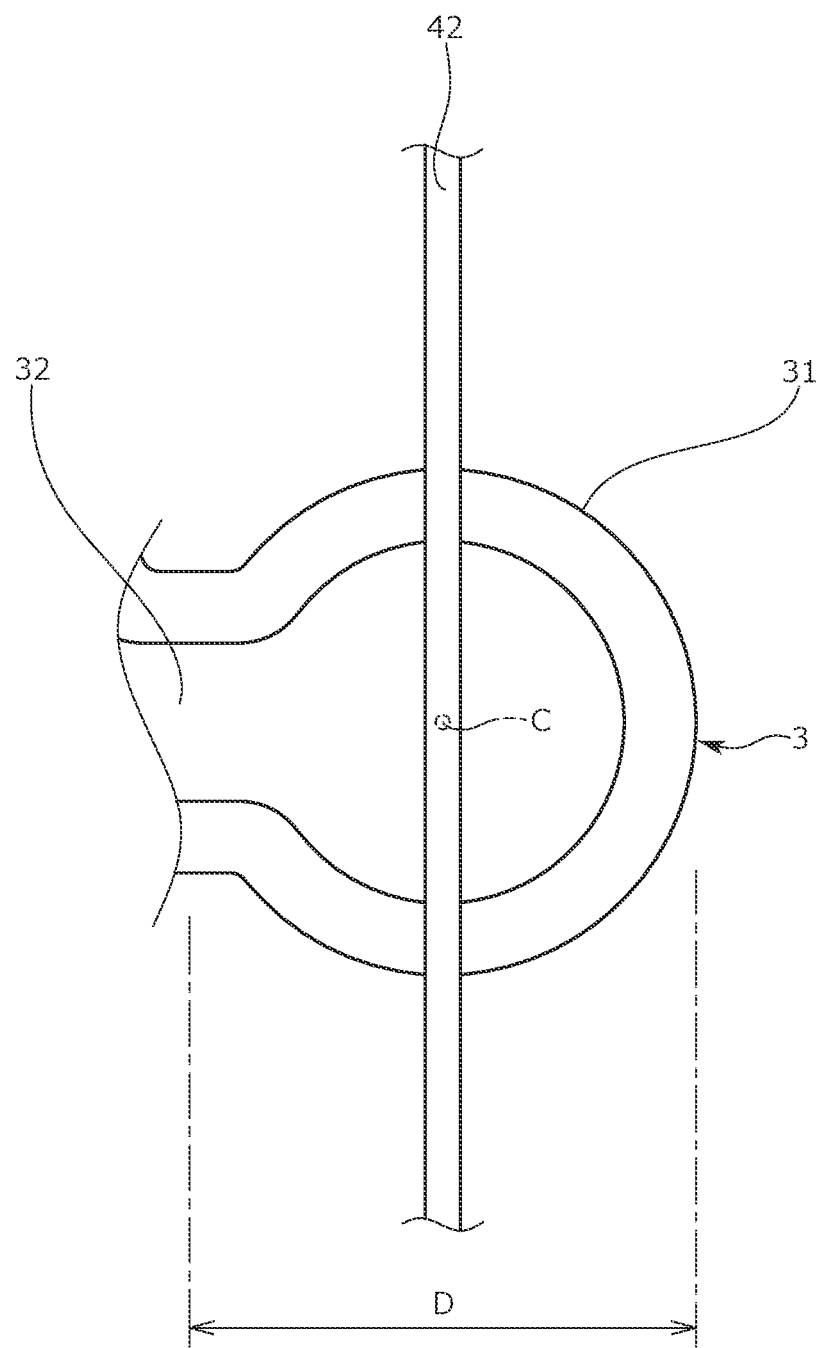
FIG. 4D is a view showing a positional relationship between the contact portion and the seat heater and is a view showing a state where a heater wire is disposed at a position where the heater wire overlaps the center of the contact portion.

Since the seat heater 4 is disposed on the load sensor 3, as shown in FIG. 3, the heater wire 42 is disposed to overlap the contact portion 31 of the load sensor 3. The heater wire 42 meanders and an interval L between the heater wires 42 adjacent to each other varies depending on the location. For this reason, when the interval between the heater wires 42 is smaller than the size (diameter D) of the contact portion 31, for example, as shown in FIG. 4A, four heater wires 42 may be disposed to overlap the contact portion 31, namely, four heater wires may be disposed to cross over the contact portion 31. As shown in FIG. 4B, three heater wires may cross over the contact portion 31. As shown in FIG. 4C, one heater wire 42 may be disposed to cross over the contact portion 31 at a position offset from a center C of the contact portion 31. As shown in FIG. 4D, the heater wire 42 may be disposed at a position where the heater wire 42 overlaps the center C of the contact portion 31.

In the vehicle seat S of the present invention, when the seat heater 4 is disposed on the contact portion 31 of the load sensor 3, as shown in FIG. 5A, the foundation fabric 41 is disposed on the electrodes 31C and 31D interposing the air layer 31E of the contact portion 31 therebetween, and the heater wires 42 are disposed on the foundation fabric 41.

For this reason, when the occupant is seated to apply a load downward (in a direction of arrow A), the load is concentrated on the heater wires 42, thereby pressing the foundation fabric 41 downward as shown in FIG. 5B, and thereby bringing the electrodes 31C and 31D of the contact portion 31 of the load sensor 3 into contact with each other to turn on the switch.

Figure 6:
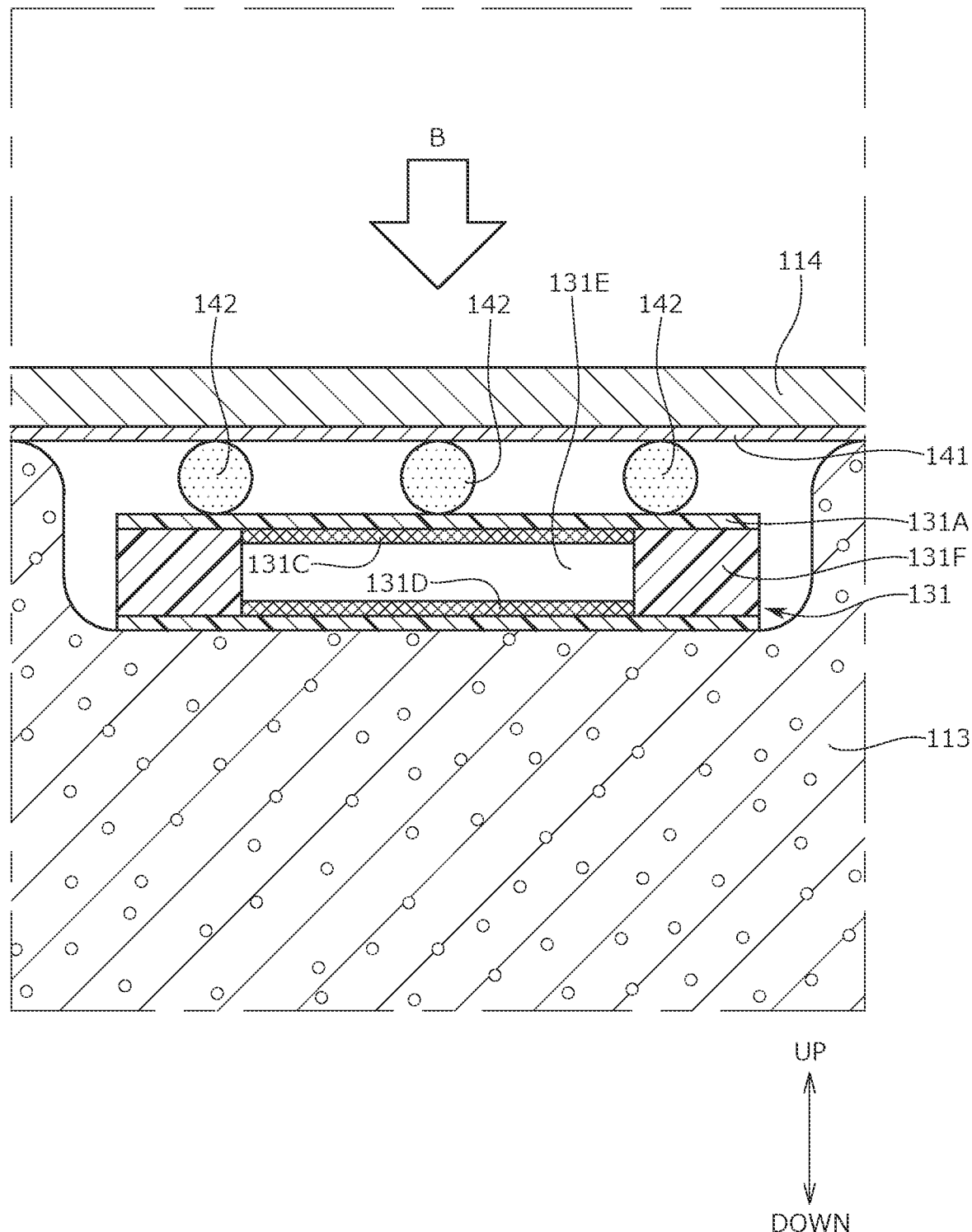
FIG. 6 is a cross-sectional view showing a positional relationship between a seat heater and a load sensor in the related art.

As shown in FIG. 6, a vehicle seat of the related art has a configuration in which heater wires 142 are disposed on a load sensor 103 and a foundation fabric 141 is disposed on the heater wires, namely, on the occupant side. For this reason, when the occupant is seated to apply a load downward (in a direction of arrow B of FIG. 6), the load is distributed by the foundation fabric 141, so that the heater wires 42 serve as beams that support the foundation fabric 141 so as not to bend. For this reason, in a case where the foundation fabric 141 is located above the heater wires 42, even when a predetermined load is applied, the foundation fabric 141 does not bend and, in a contact portion 131 of the load sensor 103, electrodes 131C and 131D interposed between surface materials 131A and 131B do not come into contact with each other, so that a switch of the contact portion 131 may be difficult to turn on.

For this reason, a configuration is employed in which as shown in FIG. 5A, the foundation fabric 41 is pressed via the heater wires 42 by disposing the foundation fabric 41 between the load sensor 3 and the heater wires 42, so that the foundation fabric 41 bends and the switch of the contact portion 31 of the load sensor 3 is easily turned on.

Figure 7:
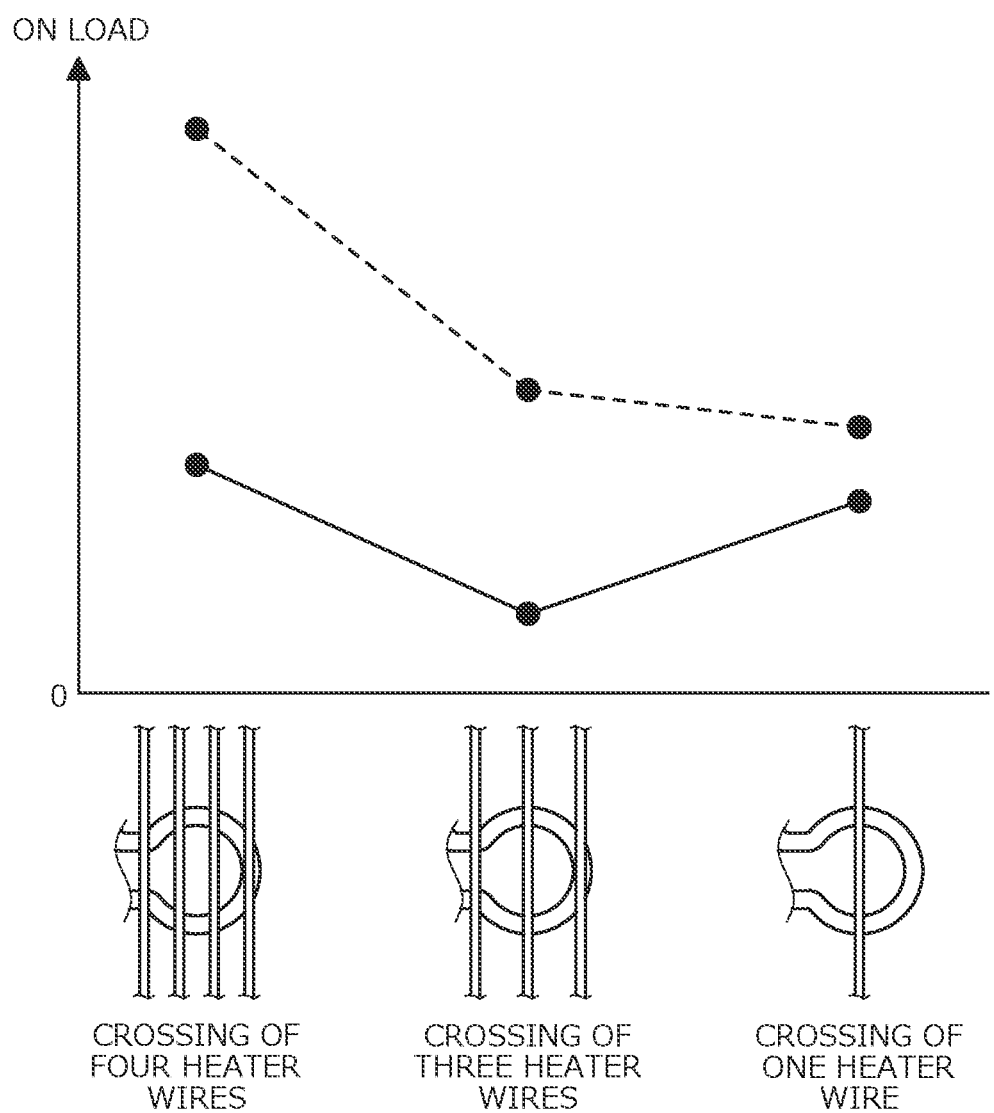
FIG. 7 is a graph that compares ON loads of the load sensors.

FIG. 7 shows a graph that compares a load required to turn on the load sensor 103 when the foundation fabric 141 is disposed on the heater wires 142 in the related art (hereinafter, referred to as an ON load) and an ON load when the heater wires 42 are disposed on the foundation fabric 41 used in the vehicle seat S of the present embodiment. The case where the foundation fabric 141 is disposed on the heater wires 142 in the related art is shown by a dotted line, and the case where the foundation fabric 41 is disposed below the heater wires 42 in the present embodiment is shown by a solid line.

As shown in FIG. 7, it can be confirmed that when four heater wires 42 are disposed on the contact portion 31 and when three heater wires 42 are disposed on the contact portion 31, the ON load is greatly reduced, and the sensitivity of the load sensor 3 to an input load is improved by disposing the foundation fabric 41 below the heater wires 42. Therefore, even when the heater wires 42 are disposed to overlap the load sensor 3, the deterioration of the sensitivity of the load sensor 3 to an input load is suppressed. For this reason, the heater wires 42 do not need to be disposed to avoid the load sensor 3, and the heater wires 42 can be disposed without considering an influence on the load sensor 3.

In addition, it can be confirmed that even when one heater wire 42 crosses over the contact portion 31, the width of reduction in ON load is small, but the ON load is reduced similarly to when four or three heater wires 42 cross over the contact portion 31, and the sensitivity of the load sensor 3 to an input load is improved by disposing the foundation fabric 41 below the heater wires 42. The ON load is reduced and the sensitivity to an input load is improved by disposing the heater wires 42 on the foundation fabric 41, so that the detection performance of the load sensor 3 is improved and the switch is easily turned on.

Figure 8:
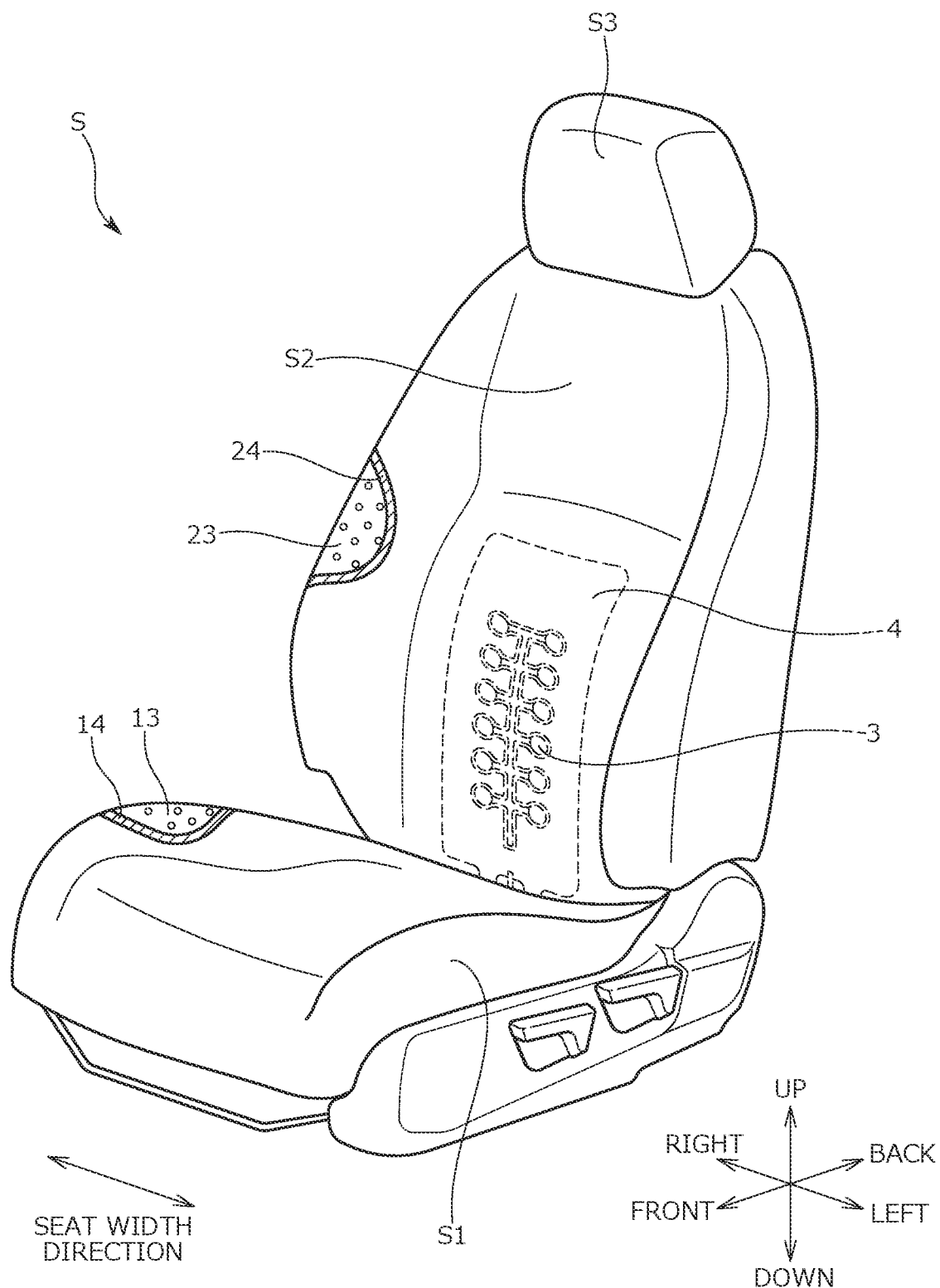
FIG. 8 is a perspective view showing an example in which the load sensor and the seat heater are attached to a seat back.

FIG. 8 shows another example of the vehicle seat S. In the vehicle seat S shown in FIG. 1, the load sensor 3 and the seat heater 4 are disposed on the seat cushion S1, but as shown in FIG. 8, the load sensor 3 and the seat heater 4 may be disposed on the seat back S2. At this time, the load sensor 3 is used as, for example, a sensor of a system that measures a heart rate or a respiratory rate of the occupant.

The load sensor 3 and the seat heater 4 are disposed on a front surface side of the seat back S2, namely, on the occupant side. The load sensor 3 is disposed on the front surface side of the back pad 23 of the seat back S2, and the heater wires 42 of the seat heater 4 are disposed on the occupant side with respect to the load sensor 3. The foundation fabric 41 is disposed between the load sensor 3 and the heater wires 42. Since the heater wires 42 are disposed on the occupant side with respect to the foundation fabric 41, the ON load of the load sensor 3 is reduced and the sensitivity of the load sensor 3 to an input load is improved as compared to when the heater wires 42 are disposed on a rear side with respect to the foundation fabric 41. For this reason, the detection performance of the load sensor 3 is improved, and when the occupant is seated, the load sensor 3 is easily turned on.

In addition, the foundation fabric 41 is fixed to the back pad 23 of the seat back S2 using an adhesive agent or the like. The foundation fabric 41 may be fixed to the trim cover 24 (skin material) attached to cover the back pad 23.

REFERENCE SIGNS LIST

S: vehicle seat (conveyance seat)
S1: seat cushion
S2: seat back
S3: headrest
F: seat frame
1: cushion frame
10: reclining mechanism
11: pan frame
12: cushion side frame
13: cushion pad
14: trim cover (skin material)
15: connection pipe
16: spring
2: back frame
21: upper frame
22: back side frame
23: back pad
24: trim cover (skin material)
27: headrest pillar
28: connection frame
29: headrest guide
3, 103: load sensor
31, 131: contact portion
  31A, 131A: surface material
  31B, 131B: surface material
  31C, 131C: electrode
  31D, 131D: electrode
  31E: air layer
  31F: adhesive material
C: center of contact portion
32: communication portion
33: circuit unit
34: harness
35: inlet and outlet port
4: seat heater
41, 141: foundation fabric (intermediate member)
42, 142: heater wire
43: circuit unit
44: harness

The invention claimed is:

1. A conveyance seat, comprising:
a seat cushion that supports buttocks of an occupant;
a seat back connected to the seat cushion to serve as a backrest for the occupant;
a load sensor provided at the seat cushion or at a portion of the seat back;
a plurality of heater wire, wherein a heater wire is disposed on an occupant side with respect to the load sensor; and
an intermediate member that positions the heater wire, wherein:
  the seat cushion and the seat back each include a pad and a skin material covering the pad,
  the load sensor includes a contact portion that is turned on and off by an applied load,
  the intermediate member is disposed between the load sensor and the heater wire,
  the heater wire is in direct contact with the back surface of the skin material, the plurality of the heater wires is disposed at positions where the heater wire overlaps the contact portion of the load sensor when viewed from the occupant side.

2. The conveyance seat according to claim 1, wherein the heater wire overlaps the contact portion of the load sensor at a position offset from a center of the contact portion.

3. The conveyance seat according to claim 1, wherein the heater wire is disposed at a position where the heater wire overlaps a center of the contact portion of the load sensor.

4. The conveyance seat according to claim 1, wherein the intermediate member is a foundation fabric, and the heater wire is fixed onto the foundation fabric.

5. The conveyance seat according to claim 4, wherein the foundation fabric is fixed to a surface of a pad forming the seat cushion or the seat back.

6. The conveyance seat according to claim 4, wherein the foundation fabric is fixed to a back surface of a skin material forming the seat cushion or the seat back.

7. The conveyance seat according to claim 1, wherein the intermediate member is a member having flexibility.

8. The conveyance seat according to claim 1, wherein the seat cushion and the seat back each include a frame forming a skeleton, a pad that is a cushion material covering the frame, and a skin material covering the pad and the frame is covered by the pad.

9. A method of manufacturing a conveyance seat, comprising:

preparing a seat cushion that supports buttocks of an occupant, a seat back that serves as a backrest for the occupant, a load sensor includes a contact portion that is turned on and off by an applied load, a heater wire, and an intermediate member that positions the heater wire, connecting the seat back to the seat cushion, providing the load sensor at the seat cushion or at a portion of the seat back, and disposing the intermediate member between the load sensor and the heat wire, wherein the seat cushion and the seat back each include a pad and a skin material covering the pad, the heater wire is in direct contact with the back surface of the skin material, and a plurality of the heater wires are disposed at positions where the heater wire overlaps the contact portion of the load sensor when viewed from the occupant side.

* * * * *